(12) United States Patent
Walker

(10) Patent No.: US 7,530,643 B1
(45) Date of Patent: May 12, 2009

(54) LOCKABLE WHEEL COVER

(76) Inventor: Dartangnan L. Walker, 1622 W. 107th St., Los Angeles, CA (US) 90047

( * ) Notice: Subject to any disclaimer, the term of this patent is extended or adjusted under 35 U.S.C. 154(b) by 156 days.

(21) Appl. No.: 11/459,056

(22) Filed: Jul. 21, 2006

(51) Int. Cl.
*B60B 7/16* (2006.01)
*B65D 55/14* (2006.01)

(52) U.S. Cl. .................. 301/37.21; 70/167; 70/259
(58) Field of Classification Search ........... 301/37.101, 301/37.21, 37.25, 37.28, 37.106, 37.108, 301/37.109; 70/225–226, 259–260
See application file for complete search history.

(56) References Cited

U.S. PATENT DOCUMENTS

| | | | |
|---|---|---|---|
| 1,300,223 A | | 4/1919 | Pride |
| 1,361,756 A | * | 12/1920 | Egbert .......................... 70/226 |
| 2,005,535 A | * | 6/1935 | Duarte ......................... 70/259 |
| 2,535,126 A | | 12/1950 | Flowers et al. |
| 2,659,229 A | * | 11/1953 | Skillman et al. .............. 70/259 |
| 3,170,733 A | * | 2/1965 | Lamme .................... 301/37.21 |
| 3,352,133 A | * | 11/1967 | Selleck ......................... 70/259 |
| 3,534,570 A | * | 10/1970 | Mauro .......................... 70/167 |
| 3,918,764 A | * | 11/1975 | Lamme .................... 301/37.21 |
| D425,847 S | | 5/2000 | Iguchi |
| D444,119 S | | 6/2001 | Brintouch |
| 6,857,709 B1 | | 2/2005 | McLean et al. |
| 2004/0232758 A1 | | 11/2004 | Freeman |

\* cited by examiner

*Primary Examiner*—Jason R Bellinger
(74) *Attorney, Agent, or Firm*—Advantia Law Group; Michael W. Starkweather; Jason P. Webb

(57) ABSTRACT

A wheel decorating device for selective ornamentation of a wheel. The device includes a planar decorative member having a cylindrical base member protruding therefrom. The base member is fixedly coupleable to a wheel, having: a first and second coupling member; a first and second locking member both actuable by a lock and key that is selectively engageable between the first and second coupling member. Additionally, the device has a lock disposed centrally on the base member; and a planar decorative member in communication with the interior of the base member, forming an access port through which the lock may be accessed. The lock has a first position that disengages the first and second locking members; a second position that engages the first locking member and disengages the second locking member; and a third position that engages both the first and second locking members.

3 Claims, 2 Drawing Sheets

LOCKABLE WHEEL COVER

BACKGROUND OF THE INVENTION

1. Field of the Invention

The present invention relates to automobile wheel decorating devices, specifically a wheel decorating device for selective ornamentation of an automobile wheel.

2. Description of the Related Art

In the related art, it has been known to use various devices to alter the appearance of wheels to make them more appealing. It is common for users of vehicles to change the appearance of the wheels/rims from time to time according to trends and/or personal tastes. Therefore there is a need for an affordable, versatile, efficient device to interchange wheels/rims of vehicles according to the preferences of vehicle users. Some improvements have been made in the field. Examples include but are not limited to the references described below, which references are incorporated by reference herein:

U.S. Pat. No. 1,418,458, issued to Patten, discloses means for locking demountable rims to wheels.

U.S. Pat. No. 6,857,709, issued to McLean et al., discloses a novel non-rotating wheel cover for use with vehicle wheels. More particularly, this invention pertains to a wheel cover which fits over the central part of a vehicle wheel and remains stationary when the vehicle wheel is rotating. A wheel cover assembly comprising: (a) a wheel cover disk; (b) a hub arm which is removably attachable to the interior face of the wheel cover disk; (c) a weight which is connected to the base of the hub arm; (d) a base plate which has stud receiving holes formed therein, the base plate being rotatably connected to the hub arm.

U.S. Pat. No. 2,535,126, issued to Flowers et al., discloses a key controlled assembly for locking automobile hub caps, and consequently the wheel and tire assembly, against unlawful removal and theft.

U.S. Patent Application Publication No. US 2004/0232758, by Freeman, discloses a freely rotating hubcap is mounted onto an existing wheel using a bearing assembly that is bolted into holes tapped into the lug nuts of the wheel. Balancing weights are added to the hubcap to ensure that it easily rotates when the wheel rotates, and can continue to rotate for a short period of time after the wheel has stopped rotating.

U.S. Design Pat. No. 444,119, issued to Brintouch, discloses the ornamental design for the wheel cover.

U.S. Design Pat. No. 425,847, issued to Iguchi, discloses the ornamental design for a wheel cover.

The inventions heretofore known suffer from a number of disadvantages which include, expensive, unappealing, difficult to use/assemble, limited in application, limited in adaptability and/or otherwise fail to alter the appearance of a vehicles wheels.

What is needed is an automobile wheel decorating device that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available wheel decorating devices. Accordingly, the present invention has been developed to provide a wheel decorating device for selective ornamentation of an automobile wheel.

According to one embodiment of the present invention, there is a wheel decorating device for selective ornamentation of a wheel that may include a substantially planar decorative member that may have a protrusion extending normally therefrom; and a base member that may be fixedly coupleable to a wheel and may include: a first coupling member that may be fixedly coupleable to a wheel; a second coupling member that may be rotatably coupleable to the first coupling member and may be configured to receive the protrusion of the planar decorative member; a first locking member that may be selectively engageable to the protrusion, thereby preventing decoupling of the second coupling member and the protrusion when the first locking member is so engaged; and a second locking member that may be selectively engageable between the first coupling member and the second coupling member, thereby preventing rotation of the second coupling member relative to the first coupling member.

Additionally, both the first and second locking members of the wheel decorating device may be actuable by a single switch that may be in the form of a lock and key. An embodiment of the present invention may also include a lock mechanism that may be disposed centrally on the cylindrically protruding base member.

Moreover, the wheel decorative device may include a substantially planar decorative member with an aperture, such as a faceplate. The decorative planar member may be in mechanical communication with the interior of the protrusion, thereby forming an access port through which the lock mechanism may be accessed. The embodiment of the invention may also include a lock that may have: a first position that may be configured to disengage both the first and second locking members; a second position that may be configured to keep the first locking member is engaged while disengaging the second locking member; a third position that may be configured to keep the locking members engaged with the planar decorative member.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
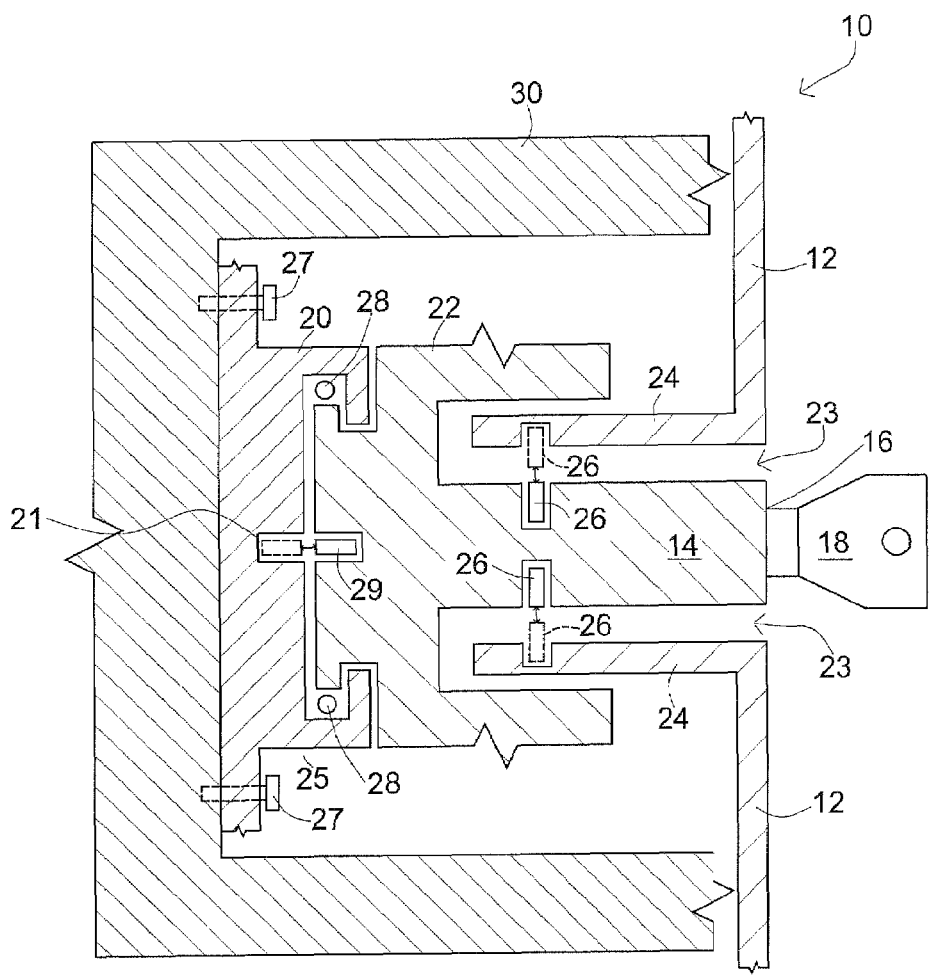
FIG. 1 illustrates a cross-sectional view of a wheel decorative device, according to one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of all embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Looking to the figures, there is an illustrated embodiment of a wheel decorating device 10 for selective ornamentation of an automobile wheel 30. The device as shown in FIG. 1 includes: a substantially planar decorative member or faceplate 12, having a protrusion 24 extending normally therefrom into an aperture 23 between a base member 14 and a second coupling member 22. The illustrated base member 14 includes: a first coupling member 20 fixedly coupleable to the wheel 30 via a bolt or screw 27; a second coupling member 22 rotatably coupleable about a bearing assembly 28 to the first coupling member 20 and designed to receive the protrusion 24 of the faceplate 12 through aperture 23; a first locking member 26 selectively engageable to the protrusion 24 of the faceplate 12, thereby preventing decoupling of the second coupling member 22 from protrusion 24 when the first locking member 26 is so engaged therethrough; and a second locking member 29 selectively engageable between the first coupling member 20 and the second coupling member 22, thereby preventing rotation of the second coupling member 22 about the bearing assembly 28 relative to the first coupling member 20.

Additionally, it is noted that the second locking member 29 may be cubical, hexagonal, etc. in shape, and constructed such that it can fit into a correspondingly shaped cavity 21 in the first coupling member 20, such that the rotation of the second coupling member 22 is inhibited by the interlocking shapes. Moreover, although FIG. 1 illustrates the second locking member 29 being positioned along the center axis of rotation, it is envisioned that the second locking member 29 can be offset such that the rotation of the second coupling member 22 may be inhibited.

Further, it is also noted in the illustrated embodiment, the first locking member 26 and second locking member 29 are both actuable by a single switch, such as a lock 16 and key 18. In addition, the lock 16 is disposed centrally on the base member 14. Moreover, the protrusion 24 of the faceplate 12 is cylindrical in shape and the faceplate 12 includes an aperture 23 in communication with the interior of the protrusion 24, thereby forming an access port 25 through which the lock 16 may be accessed.

Figure 2:
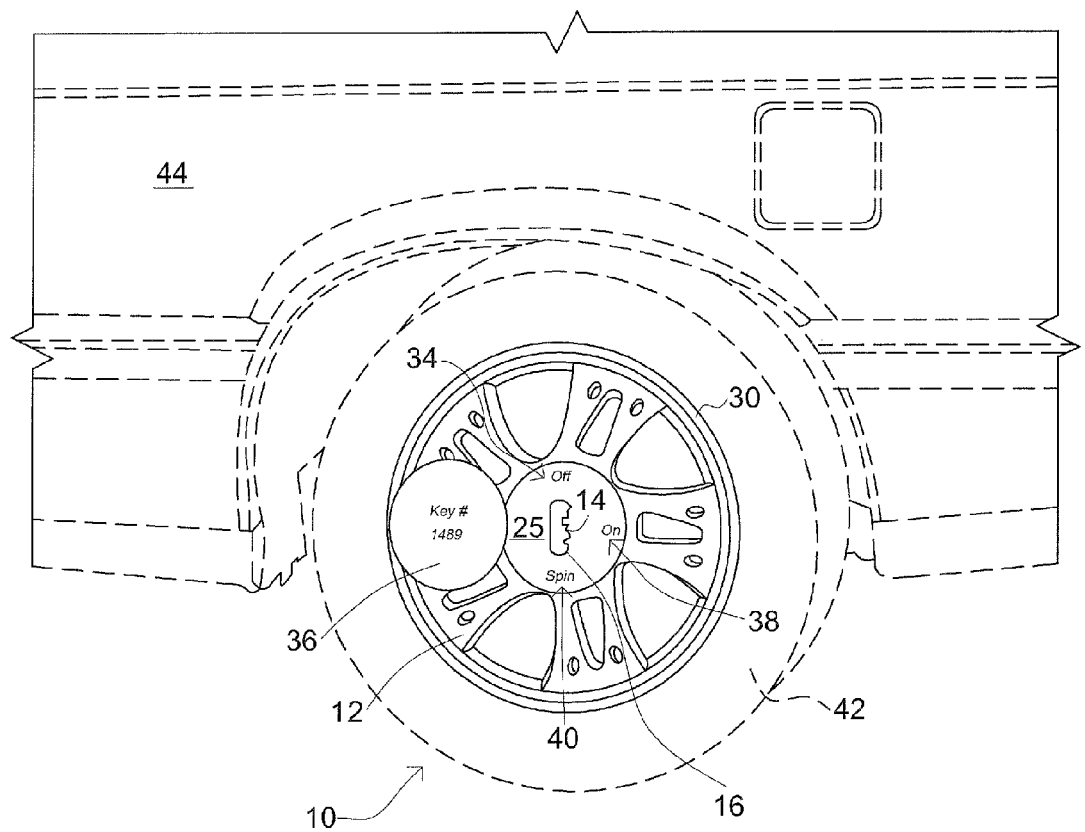
FIG. 2 illustrates a front perspective view of a wheel decorative device selectably coupled to an automobile wheel.

In operation of the illustrated embodiment of the wheel decorative device 10 in FIGS. 1 and 2, a user has the option of inserting a key 18 into the lock 16 disposed inside of a circular-shaped access port 25 in order to: remove the faceplate 12 from the wheel 30 and/or exchange the faceplate 12 with another one; rigidly secure the faceplate 12 to the wheel 30; or enable the faceplate 12 to spin independently of the wheel 30 without coming off of the wheel 30. The first option allows the user to turn the key to a first position "Off" 34 in order to disengage the second locking member 29 from the first coupling member 20 and first locking member 26 from the second coupling member 22 respectively, thereby removing the faceplate 12 without removing the wheel 30. The second option affords the user an opportunity to turn the key 18 to a second position "On" 38 to engage the first locking member 26 to the second coupling member 22 and second locking member 29 to the first locking member 26, thereby rigidly securing the faceplate 12 in-place. The finial option enables the user to turn the key 18 into a third position "Spin" 40 to engage the first locking member 26 to the second coupling member 22 while disengaging the second locking member 29 from the first coupling member 20, thereby commanding the faceplate 12 to remain affixed to the wheel 30 and rotate independently therefrom. The device also includes a cover 36 pivotally mounted to the periphery of the access port 25, allowing the user to conceal the lock 14.

It is also noted that the user desiring to customize and personalize their automobile 44 may choose from a wide range of faceplates 12 of varying sizes, shapes, designs, colors, etc. to alter the overall appearance of his or her automobile tires 42 whenever desired without actual removal and replacement of the automobile rims 30. The user can also choose base members 14 of various sizes to accommodate his or her personal requirements.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

The details of the lock 16 are not included in the illustrated embodiment in order to focus on other aspects of the present invention. One skilled in the art would know that a multipositional lock 16 may be used to trigger actuation of the first locking member 26 and second locking member 29. A non-limiting example of such a lock 16 used may be described in U.S. Pat. Nos. 6,557,912 and 6,340,185 issued to Truong, which are incorporated by reference herein.

In one embodiment, the wheel decorative device 10 may include an adapter that can be mounted on the base member 14 such that decorative planar member or faceplates 12 may be positioned closer or further to the automobile wheels 30.

In another embodiment, the wheel decorative device 10 may include a dust cover and/or a brace in various colors, shapes, and sizes that can be removably mounted on the decorative planar member 12 as to protect it from bad weather elements, theft, damage, etc.

In yet another embodiment, the wheel decorative device 10 may include decorative planar members or face plates 12 that are constructed in different shapes and sizes and in a manner such that various automobile logos may be constructed thereon. For example, BMW logos, Lexus logos, Cadillac logos, Honda logos, etc.

Additionally, although the figures illustrate a base member 14 cylindrical in shape, one skilled in the art of manufacturing automobile rims 30 would know the other embodiments of the present invention may be constructed in many different shapes. For example, cubical, elliptical, rectangular, etc.

It is also envisioned that the lock 16 and key 18 can be configured in various ways. For example, the lock 16 can be designed to accommodate various amount of grooves in the key structure and/or different key lengths and sizes.

It is expected that there could be numerous variations of the design of this invention. An example is that the planar decorative members or faceplates 12 can be customized and formed of different radii, shapes, colors, etc. to accommodate different sizes, colors, make/model of automobile rims.

Finally, it is envisioned that the components of the wheel decorative device 10 may be constructed of a variety of materials such as metal, chrome, plastic, composite material, polymer, etc.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A wheel decorating device for selective ornamentation of the wheel, comprising:
   a substantially planar decorative member having a protrusion extending normally therefrom; and
   a base member fixedly coupleable to the wheel and including:
      a first coupling member fixedly coupleable to the wheel;
      a second coupling member rotatably coupleable to the first coupling member and configured to receive the protrusion of the planar decorative member;
      a first locking member selectively engageable with the protrusion, thereby preventing decoupling of the second coupling member and the protrusion when the first locking member and the protrusion are coupled together; and
      a second locking member selectively engageable between the first coupling member and the second coupling member, thereby preventing rotation of the second coupling member relative to the first coupling member.

2. The wheel decorating device of claim 1 further comprising, a lock and key functionally coupled to one of the first and second locking members.

3. The wheel decorating device of claim 2, wherein:
   the lock is disposed centrally on the base member;
   the protrusion is cylindrical; and
   the substantially planar decorative member includes an aperture in communication with the interior of the protrusion, thereby forming an access port through which the lock may be accessed.

* * * * *